(12) United States Patent
Hale (10) Patent No.: US 10,643,405 B2
(45) Date of Patent: May 5, 2020

(54) DIAGNOSTIC METHOD, SYSTEM AND DEVICE FOR A ROTORCRAFT DRIVE SYSTEM

(71) Applicant: Bell Helicopter Textron Inc., Fort Worth, TX (US)

(72) Inventor: Rodney Keith Hale, Joshua, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 114 days.

(21) Appl. No.: 15/677,786

(22) Filed: Aug. 15, 2017

(65) Prior Publication Data

US 2018/0053359 A1 Feb. 22, 2018

Related U.S. Application Data

(60) Provisional application No. 62/376,121, filed on Aug. 17, 2016.

(51) Int. Cl.
| | | |
|---|---|---|
| *G01H 17/00* | (2006.01) | |
| *G07C 5/08* | (2006.01) | |
| *B64F 5/60* | (2017.01) | |
| *B64C 27/00* | (2006.01) | |
| *B64C 27/12* | (2006.01) | |
| *G01H 1/00* | (2006.01) | |

(Continued)

(52) U.S. Cl.
CPC .......... *G07C 5/0808* (2013.01); *B64C 27/006* (2013.01); *B64C 27/12* (2013.01); *B64F 5/60* (2017.01); *G01H 1/003* (2013.01); *G01N 29/46* (2013.01); *B64D 2045/0085* (2013.01)

(58) Field of Classification Search
None
See application file for complete search history.

(56) References Cited

U.S. PATENT DOCUMENTS 3,842,661 A * 10/1974 Marshall .................. G01H 1/00
73/576
7,224,807 B2 5/2007 Welsh et al.
7,930,111 B2 4/2011 Luo et al.
(Continued)

FOREIGN PATENT DOCUMENTS

CN 102426102 B 7/2013
EP 0889313 A2 1/1999
(Continued)

OTHER PUBLICATIONS

Examination Report, dated Feb. 12, 2018, by the EPO, re EP Application No. 17186726.0.
(Continued)

*Primary Examiner* — Jonathan M Dager
(74) *Attorney, Agent, or Firm* — Timmer Law Group, PLLC (57) ABSTRACT

A method, system, and device for diagnosing an anomaly of a monitored component in a drive train, the method including obtaining original data based on samples of a vibration signal; converting the original data to an analytical signal having a real component and an imaginary component; determining complex magnitudes of the analytical signal; processing the complex magnitudes of the analytical signal to produce a frequency-domain signal; and determining complex magnitudes of the frequency-domain signal to generate a shock spectrum.

16 Claims, 11 Drawing Sheets

(51) Int. Cl.
*G01N 29/46* (2006.01)
*B64D 45/00* (2006.01)

(56) References Cited

U.S. PATENT DOCUMENTS

| | | | |
|---|---|---|---|
| 8,131,420 B2 | 3/2012 | Lynch et al. | |
| 8,442,778 B2 | 5/2013 | Bechhoefer et al. | |
| 8,930,166 B1 | 1/2015 | Das et al. | |
| 9,145,946 B2 | 9/2015 | Heverly, II et al. | |
| 9,202,098 B2 | 12/2015 | Lewis et al. | |
| 9,308,822 B2 | 4/2016 | Matsuda | |
| 9,404,891 B2 | 8/2016 | Lih et al. | |
| 9,482,647 B2 | 11/2016 | Isom et al. | |
| 9,561,863 B2* | 2/2017 | Conrad | B64D 45/00 |
| 9,616,387 B2 | 4/2017 | Eager | |
| 9,645,046 B2 | 5/2017 | Zhang et al. | |
| 9,712,936 B2 | 7/2017 | Peters | |
| 10,380,810 B2 | 8/2019 | Hale | |
| 10,424,134 B2* | 9/2019 | Hale | B64C 27/12 |
| 2003/0028332 A1 | 2/2003 | DiMaggio et al. | |
| 2012/0271603 A1* | 10/2012 | Lee | G01M 7/022 |
| | | | 703/6 |
| 2013/0013231 A1 | 1/2013 | Banerjee et al. | |
| 2013/0116937 A1 | 5/2013 | Calhoun et al. | |
| 2014/0355726 A1* | 12/2014 | Elenes | H04L 25/03834 |
| | | | 375/343 |
| 2015/0088435 A1* | 3/2015 | Isom | G01M 13/021 |
| | | | 702/35 |
| 2015/0234951 A1* | 8/2015 | Andersson | F01K 13/02 |
| | | | 703/2 |
| 2015/0241313 A1* | 8/2015 | Kraus | G01M 17/04 |
| | | | 340/440 |
| 2015/0330867 A1* | 11/2015 | Potts | G01M 13/028 |
| | | | 73/593 |
| 2016/0033580 A1* | 2/2016 | Qiao | G01R 31/343 |
| | | | 324/765.01 |
| 2016/0195390 A1 | 7/2016 | Nissen et al. | |
| 2016/0304192 A1* | 10/2016 | Hale | B64C 27/006 |
| 2017/0011560 A1* | 1/2017 | Sheldon | B64D 45/00 |
| 2017/0028257 A1* | 3/2017 | Heverly, II | B64C 27/001 |
| 2017/0089805 A1* | 3/2017 | Sheldon | G01M 13/02 |
| 2017/0336430 A1* | 11/2017 | Winslow | G01P 3/4807 |
| 2018/0053358 A1* | 2/2018 | Hale | B64C 27/006 |
| 2018/0162548 A1* | 6/2018 | Hale | G01N 29/14 |
| 2018/0165897 A1* | 6/2018 | Hale | B64C 27/12 |

FOREIGN PATENT DOCUMENTS

| | | |
|---|---|---|
| EP | 1612458 A2 | 1/2006 |
| EP | 2221732 A1 | 8/2010 |
| EP | 2559988 A2 | 2/2013 |
| EP | 3284668 A1 | 2/2018 |
| EP | 3284669 A1 | 2/2018 |
| EP | 3284670 A1 | 2/2018 |
| EP | 3284671 A1 | 2/2018 |
| EP | 3284670 B1 | 3/2019 |
| EP | 3284671 B1 | 3/2019 |
| EP | 3284668 B1 | 10/2019 |
| EP | 3284669 B1 | 10/2019 |
| WO | 2004059399 A1 | 7/2004 |
| WO | 2016099645 A1 | 6/2016 |

OTHER PUBLICATIONS

Office Action, dated Mar. 6, 2019, by the USPTO, re U.S. Appl. No. 15/677,885.
Decision to Grant, dated Feb. 7, 2019, by the EPO, re EP Patent Application No. 17186726.0.
Decision to Grant, dated Feb. 14, 2019, by the EPO, re EP Patent Application No. 17186730.2.
Irvine; Power Spectral Density Units [G^2 / Hz]; Mar. 15, 2007.
Huang et al; The empirical mode decomposition and the Hilbert spectrum for nonlinear and non-stationary time series analysis; Jun. 3, 1996; Proc. R. Soc. Lond. A (1998) 454, 903-995.
Office Action, dated Jan. 10, 2019, by the USPTO, re U.S. Appl. No. 15/677,962.
Examination Report, dated Sep. 7, 2018, by the EPO, re EP Patent Application No. 17186532.2.
Examination Report, dated Sep. 10, 2018, by the EPO, re EP Patent Application No. 17186531.4.
Communication under Rule 71(3) EPC—Intention to Grant, dated Sep. 25, 2018, re EP Patent Application No. 17186730.2.
Communication under Rule 71(3) EPC—Intention to Grant, dated Sep. 28, 2018, re EP Patent Application No. 17186726.0.
EP Communication under Rule 71(3) EPC, dated Apr. 4, 2019, by the EPO, re EP Patent App No. 17186531.4.
EP Communication under Rule 71(3) EPC, dated Apr. 18, 2019, by the EPO, re EP Patent App No. 17186532.2.
Notice of Allowance, dated Jul. 25, 2019, by the USPTO, re U.S. Appl. No. 15/677,962.
Notice of Allowance, dated Aug. 6, 2019, by the USPTO, re U.S. Appl. No. 15/677,885.
Sharma, et al.; A review of gear fault diagnosis using various condition indicators; Procedia Engineering 144 (2016) 253-263.
Decision to Grant, dated Sep. 12, 2019, by the EPO, re EP Application No. 17186531.4.
Decision to Grant, dated Sep. 12, 2019, by the EPO, re EP Application No. 17186532.2.
European Search Report, dated Jan. 24, 2018, by the EPO, regarding EP Application No. 17186531.4.
European Search Report, dated Jan. 24, 2018, by the EPO, regarding EP Application No. 17186532.2.
European Search Report, dated Jan. 24, 2018, by the EPO, regarding EP Application No. 17186726.0.
European Search Report, dated Jan. 24, 2018, by the EPO, regarding EP Application No. 17186730.2.
Samuel et al.; A review of vibration-based techniques for helicopter transmission diagnostics; Journal of Sound and Vibration 282; pp. 475-508; Apr. 6, 2005.
Examination Report, dated Feb. 12, 2018, by the EPO, regarding EP Application No. 17186531.4.
Examination Report, dated Feb. 12, 2018, by the EPO, regarding EP Application No. 17186532.2.
Examination Report, dated Feb. 12, 2018, by the EPO, regarding EP Application No. 17186730.2.

* cited by examiner

DIAGNOSTIC METHOD, SYSTEM AND DEVICE FOR A ROTORCRAFT DRIVE SYSTEM

CROSS-REFERENCE TO RELATED APPLICATION

This application claims priority to U.S. patent application Ser. No. 62/376,121, filed Aug. 17, 2016, which is incorporated herein by reference in its entirety.

BACKGROUND

Technical Field

The present disclosure relates to a method, system, and device for diagnosing an anomaly in an aircraft drive system.

Description of Related Art

An aircraft, such as a rotorcraft or tiltrotor aircraft, may include one or more rotor systems. One example of a rotor system is a main rotor system. The main rotor system may generate aerodynamic lift to support the weight of the rotorcraft in flight and thrust to counteract aerodynamic drag and move the rotorcraft in forward flight. Another example of a rotorcraft rotor system is a tail rotor system. The tail rotor system may generate thrust in the same direction as the main rotor system's rotation to counter the torque effect created by the main rotor system. A rotor system may include a gearbox that transmits energy from a power source to the rotor blade.

The rotor and drive system are conventionally monitored using traditional time synchronous methods that receive data from at least one accelerometer as well as a tachometer. The two different sensors are typically synchronized in a precise manner that is complicated and requires precise timing and very low noise in the tachometer signal. The complexity of the traditional time synchronous methods increases cost and introduces additional potential failure modes. Failures can be difficult to diagnose due to the interplay between the two sensors.

Other methods such as cepstrum analysis and wavelet techniques have been proposed but these have limited use in most rotorcraft health and usage monitoring systems ("HUMS") systems.

There is a need for an improved diagnostic system, method, and device for a drive system.

SUMMARY

In a first aspect, there is a method of diagnosing an anomaly of a monitored component in a drive train, the method including obtaining, by a device configured to diagnose an anomaly, original data based on samples of a vibration signal; converting, by the device configured to diagnose an anomaly, the original data to an analytical signal having a real component and an imaginary component; determining, by the device configured to diagnose an anomaly, complex magnitudes of the analytical signal; processing, by the device configured to diagnose an anomaly, the complex magnitudes of the analytical signal to produce a frequency-domain signal; and determining, by the device configured to diagnose an anomaly, complex magnitudes of the frequency-domain signal to generate a shock spectrum.

In an embodiment, the step of converting includes performing a Hilbert transform.

In another embodiment, the step of processing comprises performing a discrete Fourier transform (DFT).

In one embodiment, the method also includes obtaining rotational information associated with the component; and identifying a condition indicator.

In yet another embodiment, the method includes determining a plurality of condition indicators.

In an embodiment, the method can include based upon the plurality of condition indicators, determining an unhealthy condition of the plurality of condition indicators.

In still another embodiment, the method includes identifying an unhealthy component.

In an embodiment, the method includes adjusting at least one of the operation and maintenance of the unhealthy component.

In another embodiment, the device is configured to diagnose an anomaly further includes a display; wherein the device provides a real-time indication of an anomaly in the monitored component.

In one embodiment, the method further comprises storing a history, by the device configured to diagnose an anomaly, of original data; wherein the history being stored before the diagnostic operation for the component is performed.

In a second aspect, there is provided a device configured to diagnose an anomaly of a monitored component in a drive train, the device including a memory configured to store original data based on samples of a vibration signal; one or more processors in communication with the memory, the one or more processors being configured to: obtain original data based on samples of a vibration signal; convert the original data to an analytical signal having a real component and an imaginary component; determine complex magnitudes of the analytical signal; process the complex magnitudes of the analytical signal to produce a frequency-domain signal; and determine complex magnitudes of the frequency-domain signal to generate a shock spectrum.

In an embodiment, the processors are configured to obtain rotational information associated with the component; and identify a condition indicator.

In still another embodiment, the processors are configured to determine a plurality of condition indicators.

In an embodiment, the processors are configured to based upon the plurality of condition indicators, determine an unhealthy condition of the plurality of condition indicators; and identify an unhealthy component.

In one embodiment, the processors are configured to adjust at least one of the operation and maintenance of the unhealthy component.

In another embodiment, the device further includes a display; wherein the device provides a real-time indication of an anomaly in the monitored component.

In an embodiment, the original data is stored before the diagnostic operation for the component is performed.

In a third aspect, there is provided a system for diagnosing an anomaly of a monitored component in a drive train, the system including a rotorcraft comprising a body, a power train coupled to the body and comprising a power source and a drive train coupled to the power source; a vibration sensor system coupled to the drive train; and a diagnostic device associated with the vibration sensor system, the diagnostic device operable to obtain original data based on samples of a vibration signal; convert the original data to an analytical signal having a real component and an imaginary component; determine complex magnitudes of the analytical signal; process the complex magnitudes of the analytical signal to produce a frequency-domain signal; and determine complex magnitudes of the frequency-domain signal to generate a shock spectrum.

In an embodiment, the vibration sensor system comprises at least one accelerometer.

In a fourth aspect, there is non-transitory computer-readable storage medium encoded with instructions that, when executed, cause one or more processors of a computing device to diagnose an anomaly of a monitored component in a drive train to: obtain original data based on samples of a vibration signal; convert the original data to an analytical signal having a real component and an imaginary component; determine complex magnitudes of the analytical signal; process the complex magnitudes of the analytical signal to produce a frequency-domain signal; and determine complex magnitudes of the frequency-domain signal to generate a shock spectrum.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Illustrative embodiments of a method, system, and device for diagnosing an anomaly in an aircraft drive system are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
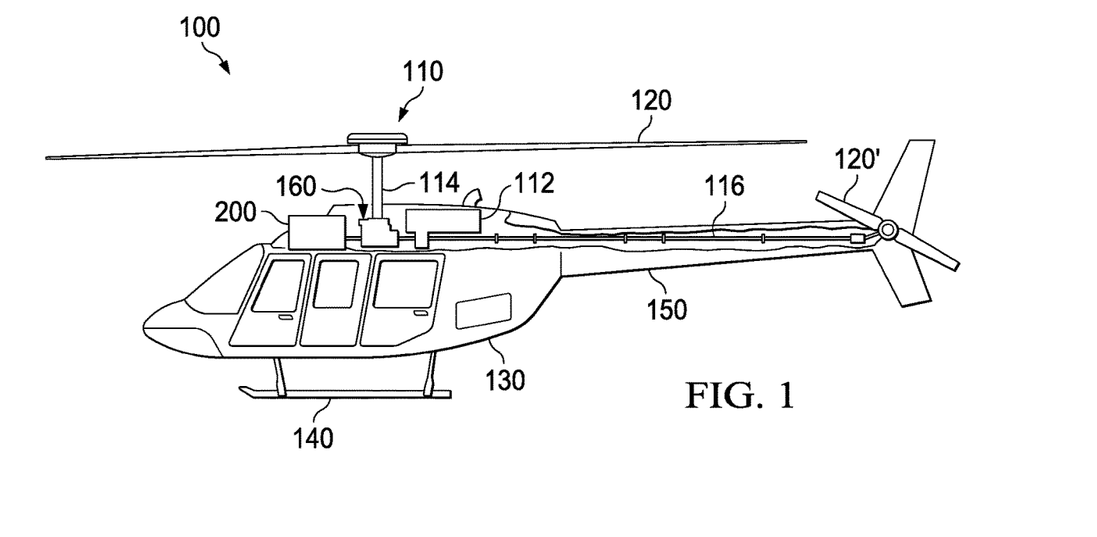
FIG. 1 is a side view of a rotorcraft, according to an example embodiment.

Referring to FIG. 1 in the drawings, a rotorcraft 100 is illustrated. Rotorcraft 100 can include drive train system 110, main rotor blades 120, tail rotor blades 120', a fuselage 130, a landing gear 140, and a tail member 150. Drive train system 110 may rotate blades 120 and/or blades 120'. Drive train system 110 and blades 120' may collectively provide thrust in the same direction as the rotation of blades 120 so as to counter the torque effect created by blades 120.

Fuselage 130 represents the body of rotorcraft 100 and may be coupled to drive train system 110 such that drive train system 110 and blades 120 move fuselage 130 through the air. Landing gear 140 supports rotorcraft 100 when rotorcraft 100 is landing and/or when rotorcraft 100 is at rest on the ground. The tail member 150 represents the tail section of the aircraft and features blades 120'.

In the example shown in FIG. 1, drive train system 110 includes an engine 112, a gearbox 160, a main rotor mast 114, and a tail rotor drive shaft 116. Engine 112 supplies torque to the main rotor mast 114 via gearbox 160 for rotating of blades 120. Engine 112 also supplies torque to tail rotor drive shaft 116 for rotating of blades 120'. In the example of FIG. 1, gearbox 160 is a main rotor transmission system. Teachings of certain embodiments recognize, however, that drive train system 110 may include more or different gearboxes than gearbox 160 shown in FIGS. 1 and 2A-2B. Drive train system 110 may include a control system for selectively controlling the pitch of each blade 120 in order to selectively control direction, thrust, and lift of rotorcraft 100. Gears, bearings, main rotor mast, and tail rotor drive shaft, and other mechanical components or systems of drive train 110 produce vibrations due to contact and movement with other components during operation.

Rotorcraft 100 further comprises a diagnostic system 200 for detecting an anomaly of a monitored component configured to identify and alert an operator, technician, or manufacturer to vibratory anomalies that may reflect a malfunctioning gear, bearing or other drive system related component. It should be appreciated that teachings from rotorcraft 100 may apply to aircraft other than rotor, such as airplanes, tiltrotor, hovercraft, unmanned aircraft, to name a few examples, and may apply to other industries including, but not limited to, automotive, ships, and industrial applications involving fixed equipment with rotational elements. The embodiments herein are illustrated with regard to a drive train for a main rotor assembly on a rotorcraft; however, it should be appreciated that the embodiments may be adaptable to a tail rotor assembly.

Figure 2A:
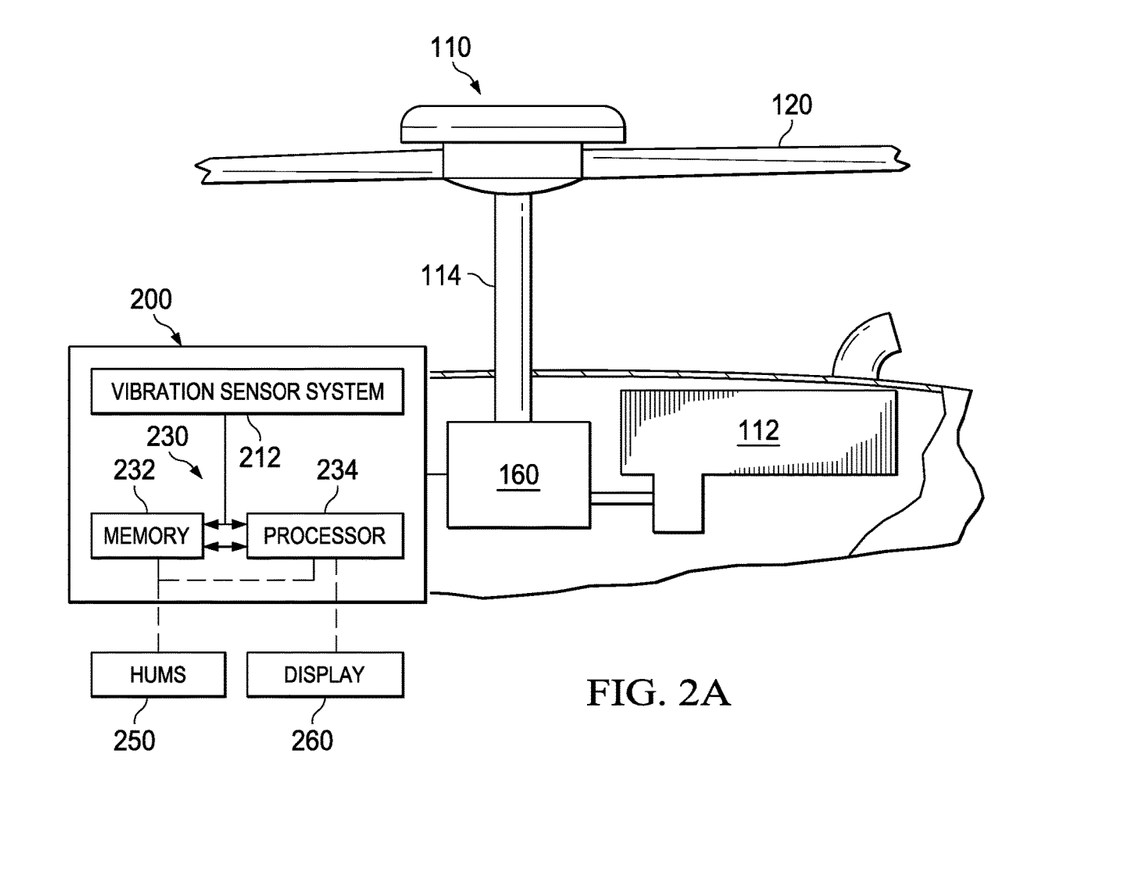
FIGS. 2A-2B shows exemplary diagnostic systems with a drive train system for a rotorcraft.
Figure 2B:
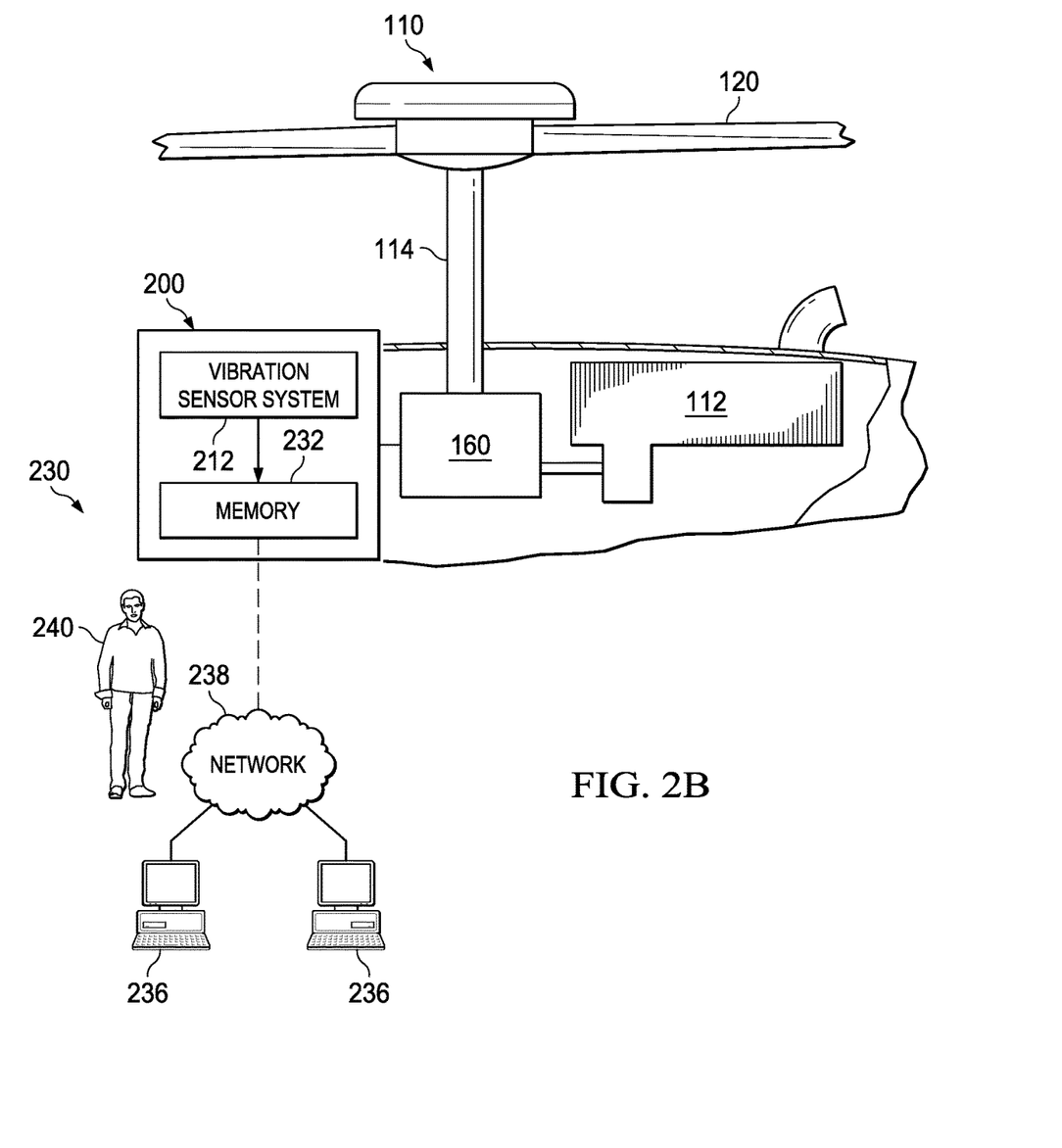

Diagnostic system 200, as shown in FIGS. 2A-2B, can include a vibration sensor system 212 coupled to the drive train 110 and a diagnostic device 230, as shown in FIGS. 1 and 2A-2B. The diagnostic device 230 can represent any form of computing device capable of implementing the techniques described in this disclosure, including a handset (or cellular phone), a tablet computer, a smart phone, or a desktop computer. Diagnostic device 230 is configured to diagnose an anomaly in the component or system being monitored and can be operated by a user. In one embodiment, as shown in FIG. 2A, diagnostic device 230 is disposed on a rotorcraft 100. In another embodiment, as shown in FIG. 2B, at least a portion of the diagnostic device 230 is disposed on the rotorcraft and can be implemented by one or more computers across one or more networks.

Referring now to FIGS. 3A-3D, vibration sensor system 212 can include one or vibration sensors 216 configured to measure at least one of vibration, sound, and/or acoustic signals within and/or produced from the monitored component and/or system. In an embodiment, the vibration sensor is, includes, or is part of an accelerometer. In an embodiment, only one sensor is located on a gearbox to monitor the health of the drive train 110. For example, as shown in FIGS. 3A-3D, one or more vibration sensors can be coupled to the gearbox 160. In an embodiment, at least two, three, four, five, six or more vibration sensors 216 are provided to monitor the health of the monitored component or system. A further embodiment provides a plurality of sensors to monitor the health of the drive train 110 and/or a component thereof.

Vibration sensors 216 can comprise accelerometers configured to provide a signal output corresponding to the acceleration of the sensors 216 in various directions (e.g., fore-aft, lateral, and vertical directions). In other embodiments, vibration sensors 216 can comprise other types of sensors capable of measuring vibration of a drive train system 110, such as a single-axis sensor, a multiple-axis sensor, a piezo electric sensor (either integrated electronics or with separate charge converter), and a micro electromechanical system (MEMS) type of sensor, and the like. In an embodiment, the vibration sensors 216 are only accelerometers.

The vibration sensor 216 may be connected directly to the monitored component or system and may include a bracket attached to the vibration sensor 216. In an exemplary embodiment shown in FIGS. 3A-3B, vibration sensor 216 is mounted to bracket 218. Bracket 218 is coupled to gearbox case 162 with a fastener 220 (e.g., a bolt, pin, screw, etc.). In an illustrative embodiment shown in FIG. 3C, like features are identified by like numerals with a primed (') suffix and new features are identified by new numerals, including a rotorcraft gearbox 160' and gearbox case 162', sensor 216' is coupled via a direct mounting connection to gearbox case 162'. Sensor 216' is secured to an extended fastener 220' having an extended length for receiving the sensor 216' thereon and also secures portions of the gearbox case 162' or other components of the drive train 110 together.

Figure 3A:
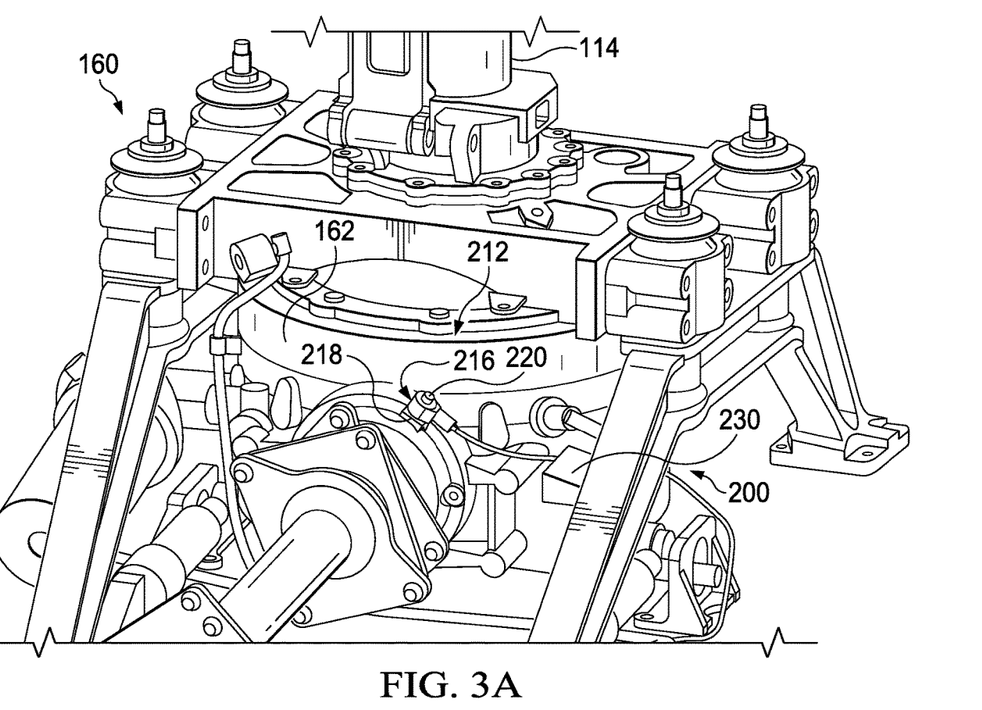
FIG. 3A is a perspective view of a gearbox in a drive train system; according to an illustrative embodiment.
Figure 3B:
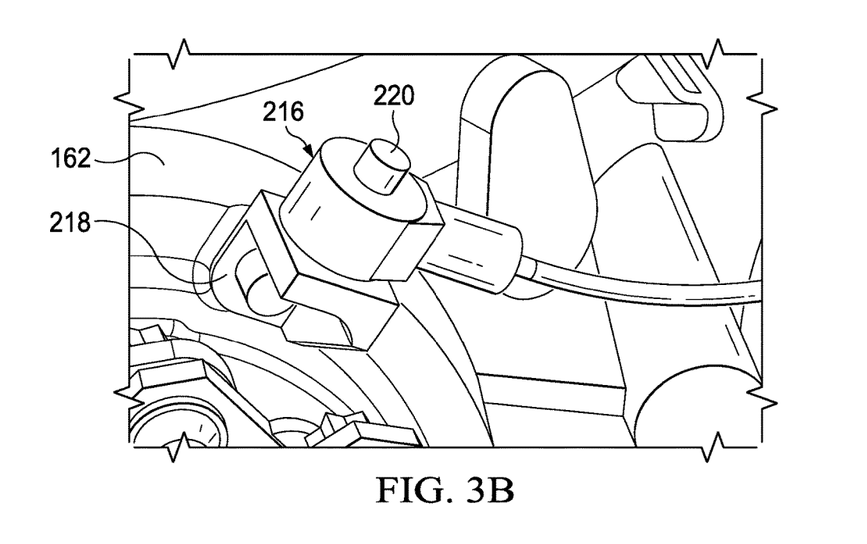
FIG. 3B is a perspective view of a sensor mounted to the gearbox in FIG. 3A.
Figure 3C:
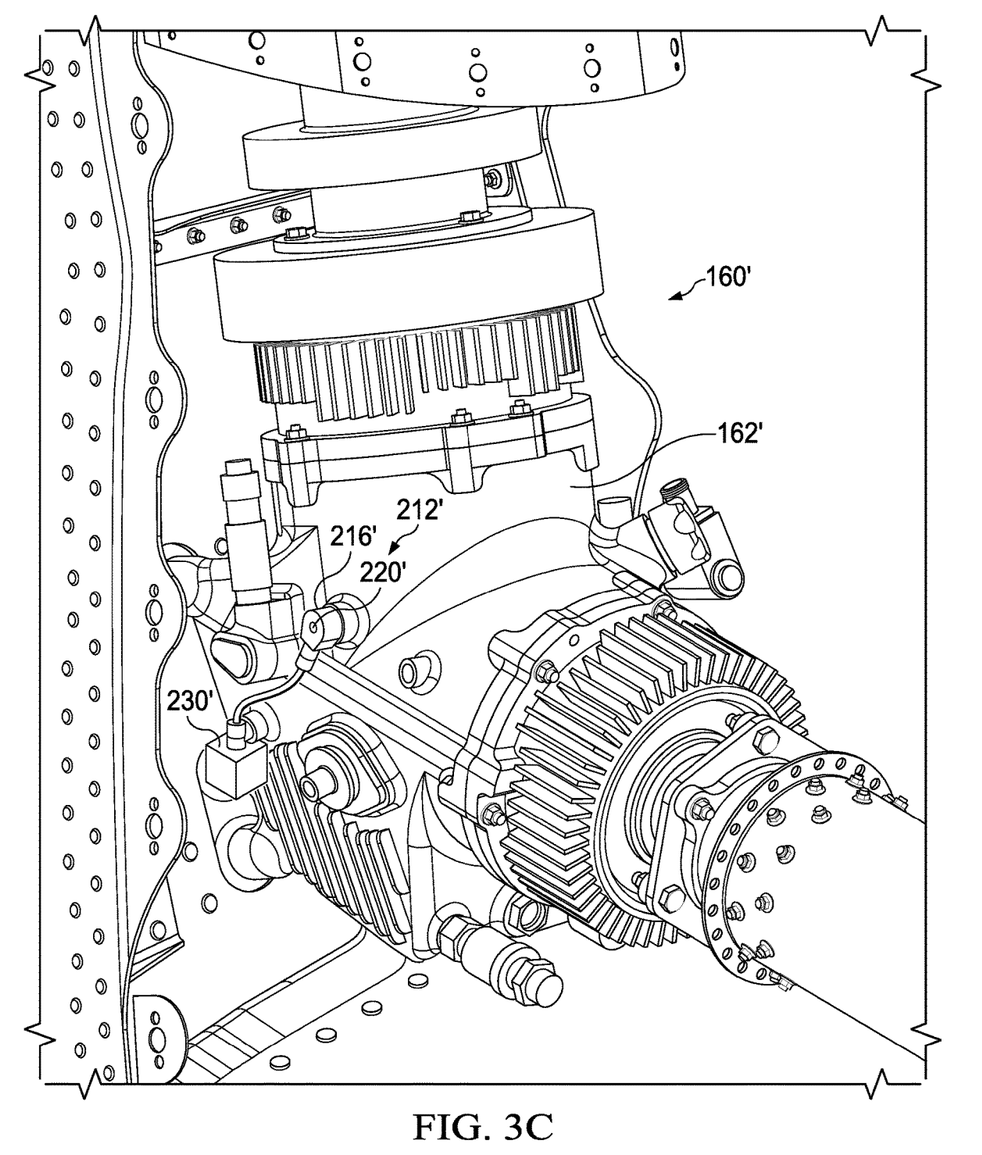
FIG. 3C is a perspective view of sensor mounted to a gearbox, according to an exemplary embodiment.
Figure 3D:
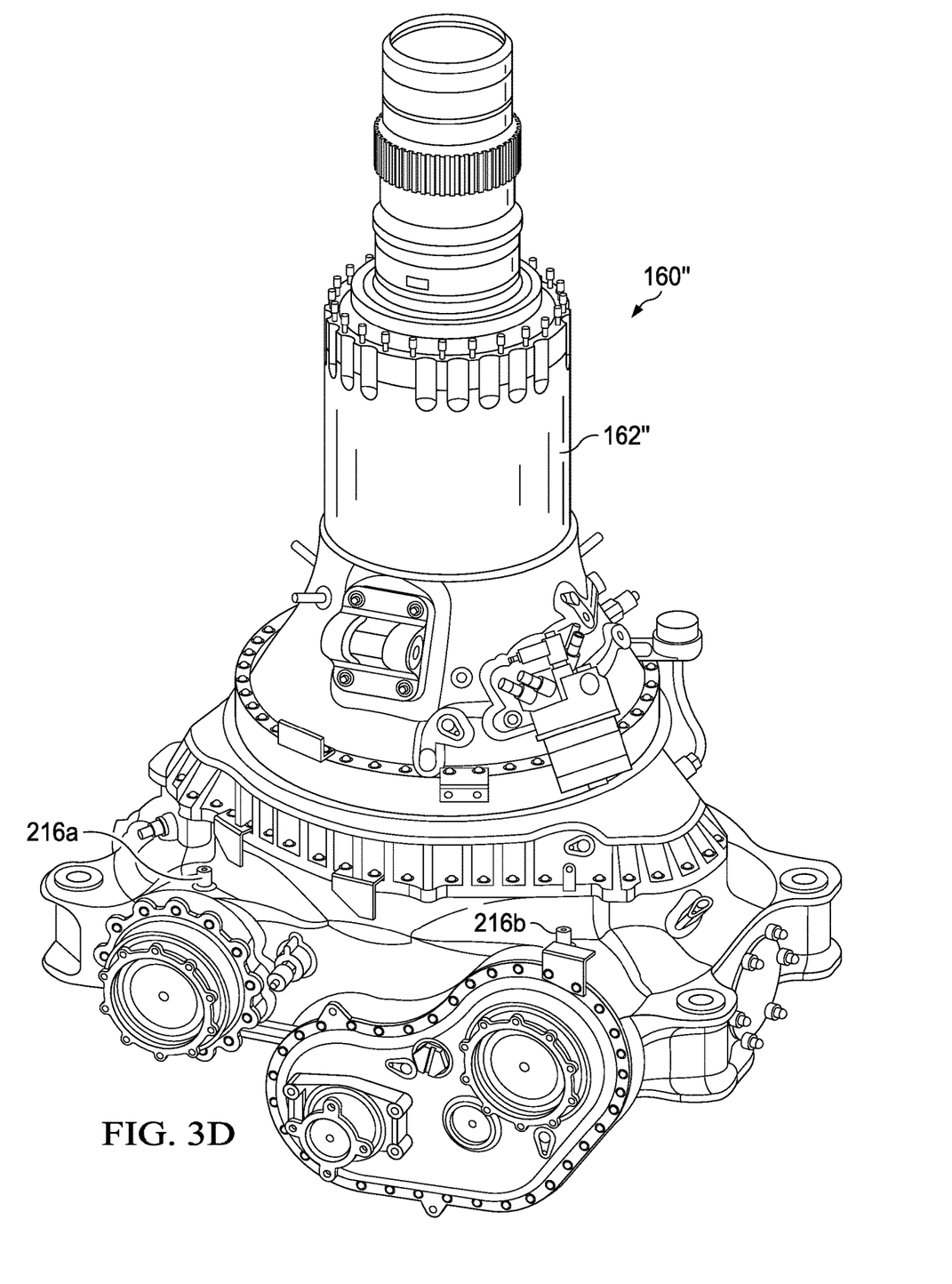
FIG. 3D is a perspective view of two sensors mounted to a gearbox, according to an illustrative embodiment.

One or more vibration sensors 216 can be disposed at one or more locations on drive train 110 to monitor the health of the drive system 110 or other rotational systems. Vibration sensor 216 can be coupled to at least one of a gearbox, a bearing housing, a hanger bearing housing, a swashplate bearing housing, an engine, a transmission gearbox, engine gearbox, an oil blower, an oil cooler, a main rotor mast, a tail rotor drive shaft, a rotating component in drive train system, and a rotating system in a drive train system. Sensor 216 can be disposed on, in, in a passage adjacent to, or, near the monitored component or system. In an embodiment, vibration sensor 216 is disposed on a gearbox adjacent to gears therein. In the exemplary embodiment shown in FIG. 3A-3B, the sensor 216 is disposed on the input drive of gearbox 160. In another embodiment shown in FIG. 3C, the sensor 216' is disposed mid-case of gearbox 160'. FIG. 3D shows another illustrative embodiment with like features identified by like numerals with a double primed (") suffix and new features are identified by new numerals, including a first sensor 216a disposed adjacent to the left-hand input drive and a second sensor 216b disposed adjacent to the right-hand input drive. FIGS. 3A-3D are illustrative embodiments and not limiting examples showing the location of the sensors 216 in system 212.

During operation, gearbox 160 may transmit power from a power source (e.g., engine 112) to the object(s) to be moved (e.g., components in the drive train 110), which produces vibrations, sounds, and/or acoustic signals. The vibration sensor systems 212, 212' are each configured to measure vibrations, sounds, and/or acoustic signals from the drive train 110 and send an output of original data (e.g., the measurements of the vibrations, sounds, and/or acoustic signals) to the diagnostic device 230, 230'. In some embodiments, the vibration sensor system 212, 212' can provide rotational information associated with the monitored component or system.

Figure 4A:
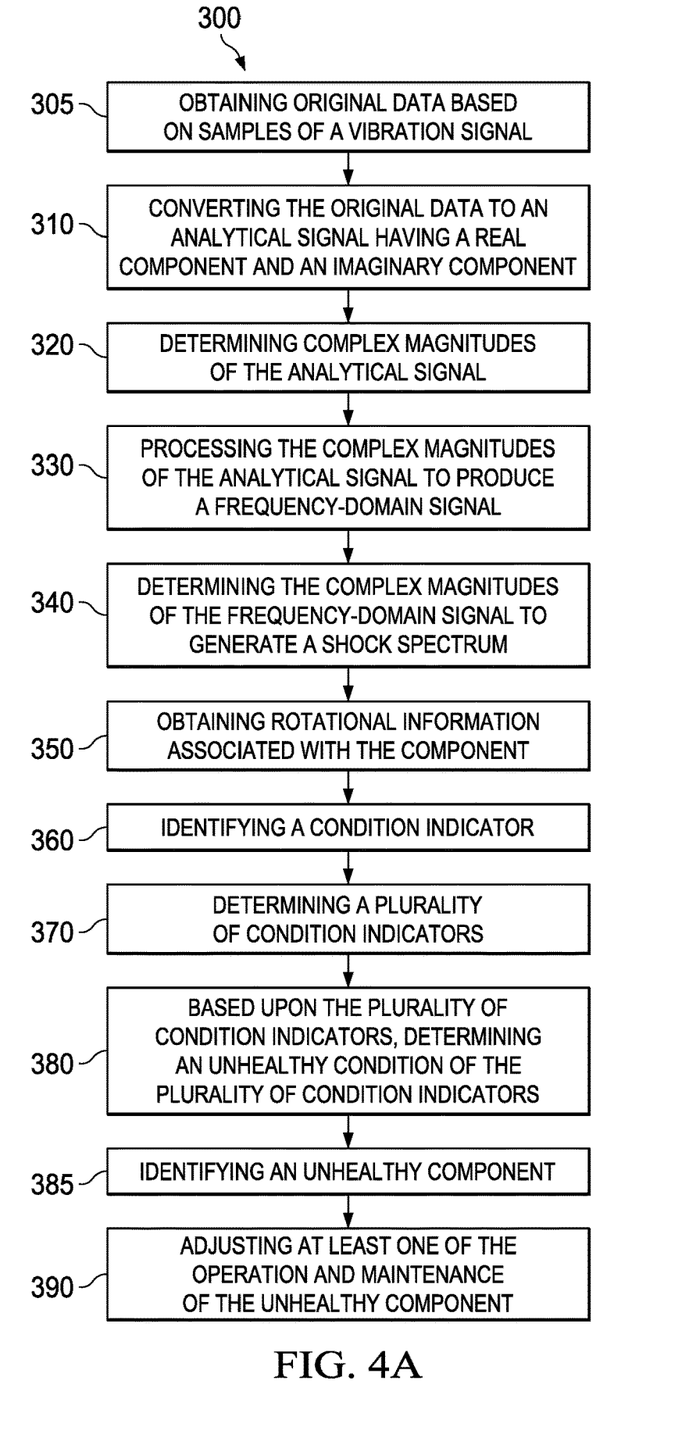
FIGS. 4A-4B are flowcharts showing exemplary diagnostic methods.
Figure 4B:
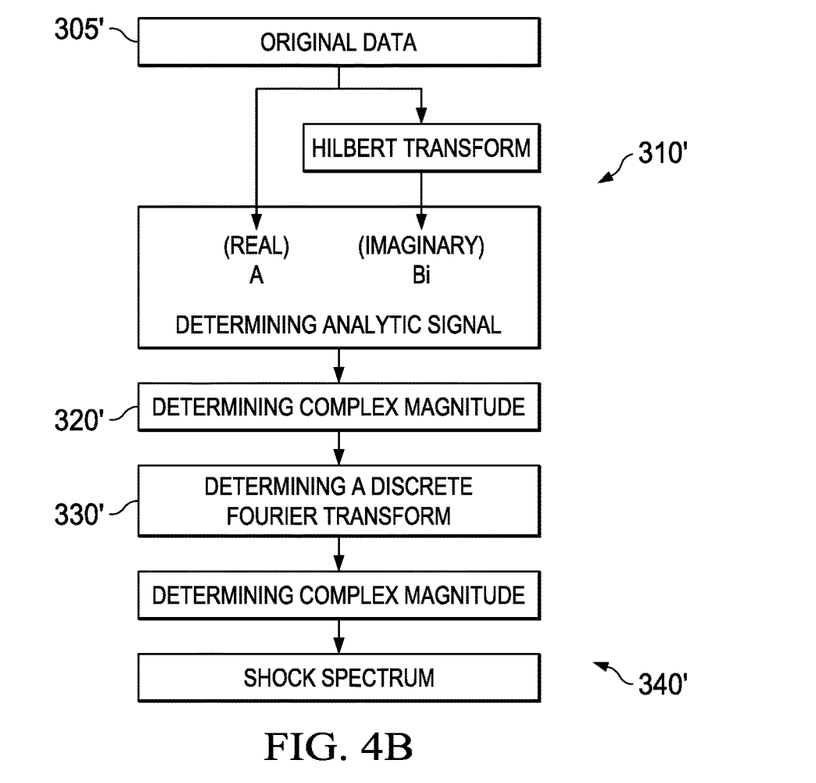

Diagnostic device 230 is configured to implement the method 300 of diagnosing an anomaly of a monitored component in a drive train 110. Method 300, as shown in FIGS. 4A-4B, can include at least one or more of the following steps: a step 305 of obtaining original data based on samples of a vibration signal; the step 310 of converting the original data to an analytical signal having a real component and an imaginary component; the step 320 of determining complex magnitudes of the analytical signal; the step 330 of processing the complex magnitudes of the analytical signal to produce a frequency-domain signal; the step 340 of determining complex magnitudes of the frequency-domain signal to generate a shock spectrum; the step 350 of obtaining rotational information associated with the component; the step 360 of identifying a condition indicator; the step 370 of determining a plurality of condition indicators; the step 380 that is based upon the plurality of condition indicators, determining an unhealthy condition of the plurality of condition indicators; the step 385 of identifying an unhealthy component; and the 390 of adjusting at least one of the operation and maintenance of the unhealthy component.

Figure 6A:
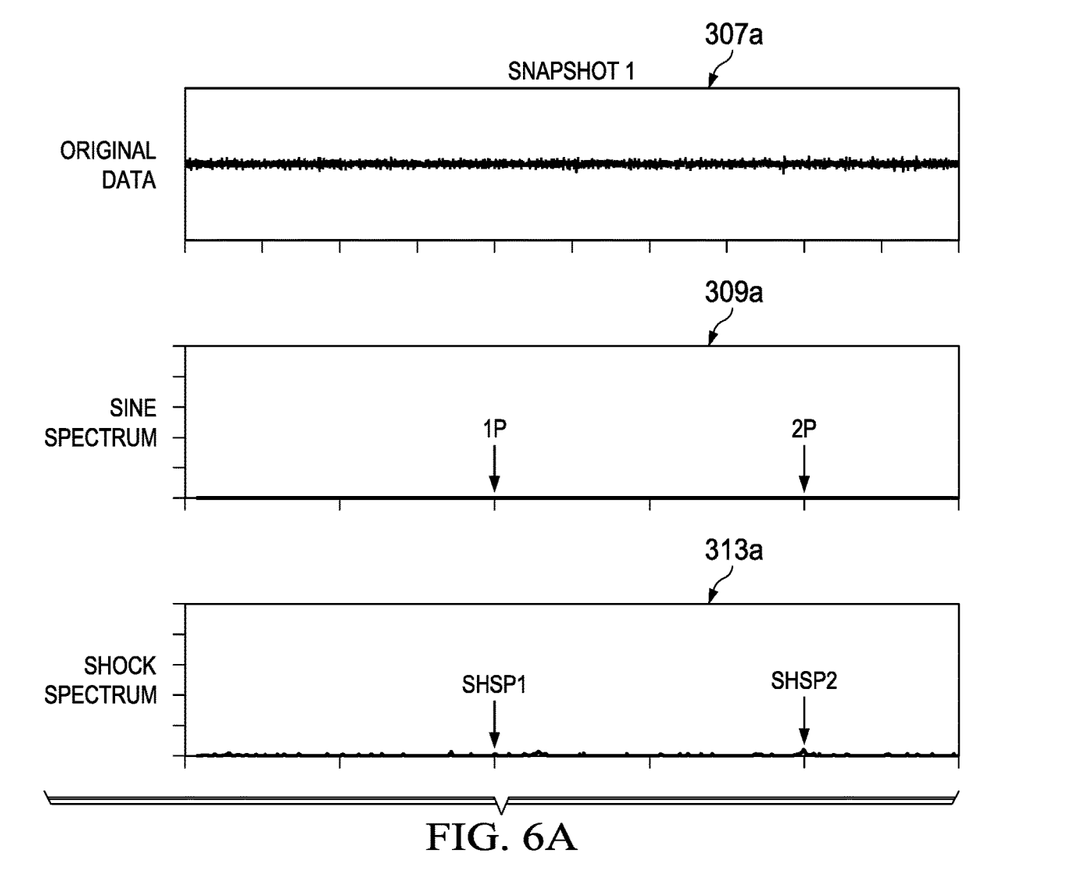
FIGS. 6A-6C are graphs illustrating three snapshots in time of original data, sine spectrum, and shock spectrums of a component degrading, according to an illustrative embodiment.
Figure 6B:
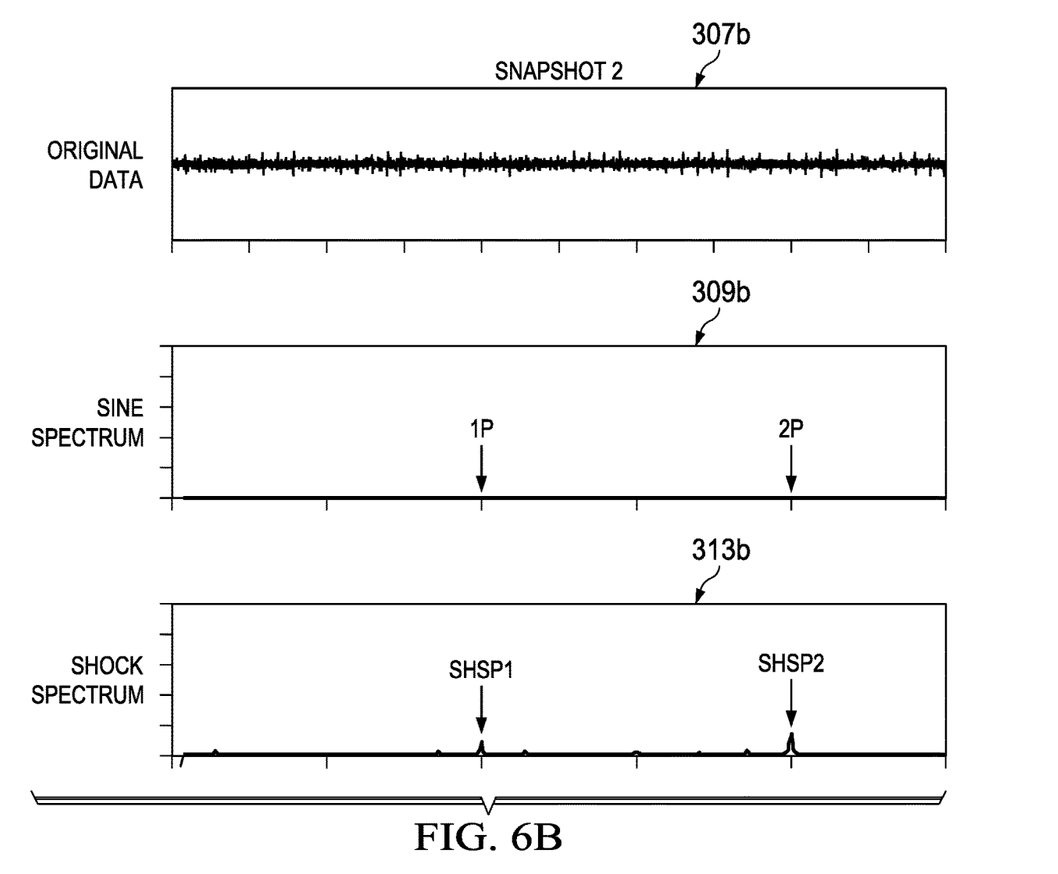
Figure 6C:
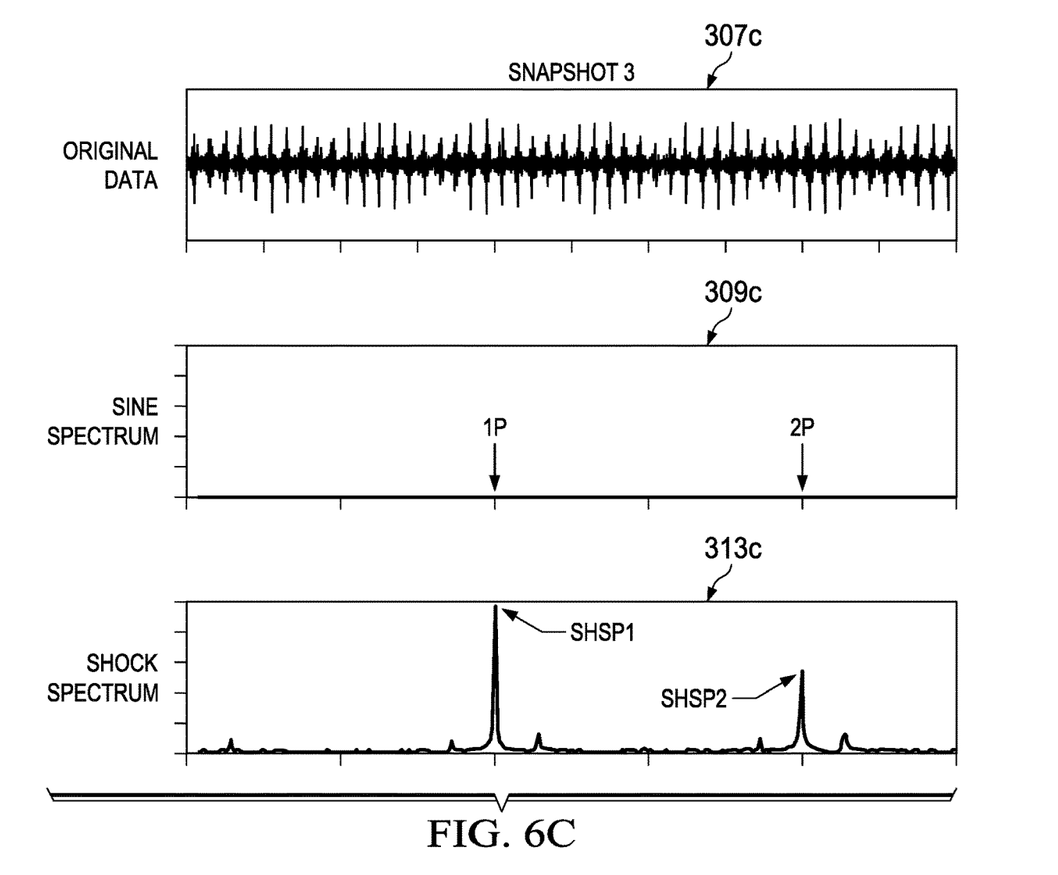

Method 300 can include the step 305 of obtaining original data based on samples of vibration signal. Vibration sensor system 212 can generate vibration signal data that is referred to herein as original data. In an embodiment, original data is a digital signal. In some embodiments, the original data can be digitized time-domain data. The diagnostic device 230 can randomly select, or sample, the measurements in the original data to obtain a snapshot of original data. In an embodiment, the original data is selected by sampling and digitizing a vibration signal at predetermined intervals of time. It should be appreciated that the sampling rate can be modified for each different application (e.g., each different type of gearbox). FIGS. 6A-6C illustrate exemplary snapshots of original data 307a, 307b, 307c generated from one vibration sensor 216a positioned on a gearbox casing 162 adjacent to left-hand input drive in FIG. 3D.

The samples of the original data are then converted in step 310 to an analytical signal having a real component and an imaginary component. An illustrative embodiment of method 300 is shown in FIG. 4B, the analytic signal is a complex with the real part being the original data and the imaginary part being the Hilbert transform of the original data as shown at steps 310'. Once the analytic signal is determined in step 310, the complex magnitudes of the analytical signal is determined in step 320.

Figure 5:
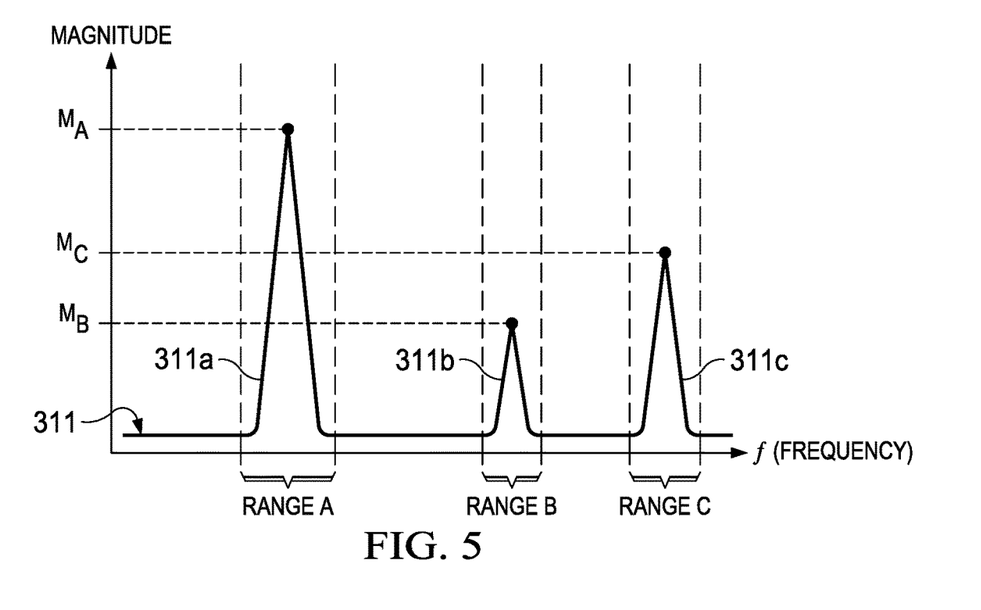
FIG. 5 is a prophetic example of a graph illustrating a shock spectrum, according to an exemplary embodiment.

The complex magnitudes of the analytical signal are then processed to produce a frequency-domain signal in step 330. In an embodiment, the processing of the complex magnitudes is achieved by a discrete Fourier transform at step 330'. The complex magnitudes of the frequency-domain signal are then determined in step 340, which generates a shock spectrum. FIG. 5 illustrates an exemplary shock spectrum 311 at a point in time (e.g., for a snapshot of original data). The X axis represents the frequency of the shock spectrum 311. The Y axis represents the magnitude of the shock spectrum 311. Shock spectrum 311 includes three spectral bands 311a, 311b, 311c, each having a frequency range A, B, C, respectively. Each of the three spectral bands 311a, 311b, 311c has a peak magnitude designated as $M_A$, $M_B$, and $M_C$, respectively. Each of the peak magnitudes $M_A$, $M_B$, and $M_C$ in the shock spectrum 311 is a condition indicator.

One of the unique features of method 300 is that the shock spectrum is generated by using the equivalent of a shock wave as the fundamental element in a discrete Fourier transform of the original data. The shock spectrum is in contrast to the conventional sine spectrum, shown as 309a, 309b, 309c in FIGS. 6A-6C, which is the spectrum created by using a sine wave as the fundamental element in a Discrete Fourier Transform of the original data. The traditional Sine Spectrum is typically produced by discrete transforming of the original data by a Fast Fourier transform (FFT) algorithm. When a rotating component begins to fail or otherwise be in an unhealthy condition, the component tends to send out repeating transient pulses with repetition rate related to the rotating speed of the component. The waveform composed of these repeating transient pulses is referred to as a shock wave. As the component degrades further, the pulses tend to increase in amplitude and width as depicted in the original data 307a-307c in FIGS. 6A-6C, and, if the degradation continues, the pulses may widen enough to have some sine wave energy content and the degradation be detectable by a traditional Sine Spectrum. As shown in FIGS. 6A-6C the traditional Sine Spectrums 309a-309c may not identify the transient pulses as early as the shock spectrums 313a-313c generated in method 300. Advantageously, the steps in method 300 transform a repetitive transient pulse signal into a sine wave when generating the shock spectrum such that an unhealthy component can be identified. Method 300 including the step of generating a shock spectrum is particularly advantageous for gears and bearings in a drive train because the gears and-bearings have a tendency to send out a transient pulse signal when starting to degrade.

Method 300 can include the step 350 of obtaining rotational information associated with the component. Once the shock spectrum is created the rotating speed of the gearbox component being assessed is obtained. In an embodiment, the vibration sensor system 212 can obtain and transmit rotational information of the component to the diagnostic device 230. In another embodiment, the HUMS 250 can obtain and transmit rotational information directly related to the component to the diagnostic device 230. In an embodiment, the rotational information is the rotational speed of a drive train shaft and/or other components associated therewith.

Method 300 can include the step 360 of identifying a condition indicator. Once the shock spectrum is created, the rotating speed of the monitored component is used to identify the spectral lines corresponding to the frequency range at which sub-algorithms can be determined to identify a condition indicator. The sub-algorithms extract the condition indicator from a range within a single shock spectrum. Based on the rotating speed of the component, each sub-algorithm defines a different frequency range in the shock spectrum and the maximum peak level in that frequency range is used to identify the condition indicator for the particular sub-algorithm. The exemplary shock spectrum in FIG. 5 shows range A, range B, and range C, which can each be identified by three sub-algorithms. The sub-algorithms determine the frequency range in the shock spectrum; for example, shock spectrum 1 (SHSP1) can identify range A, and then extract the maximum peak level within that frequency range (e.g., $M_A$ is the maximum peak level in range A) to identify the condition indicator for that particular component.

In an exemplary embodiment, the sub-algorithms can include shock spectrum 1 (SHSP1), which is the magnitude at the shock spectral line corresponding to the rotating speed of the component (1 per rev or 1P), and shock spectrum 2 (SHSP2), which is the magnitude at the shock spectral line corresponding to twice the rotating speed of the component (2 per rev or 2P). In some embodiments, the sub-algorithms can further include at least one of the following: shock spectrum bearing rolling element (SHSPB), shock spectrum bearing cage (SHSPC), shock spectrum bearing cage 2 (SHSPC2), shock spectrum bearing inner race (SHSPN), and shock spectrum bearing outer race (SHSPO). SHSPB is the magnitude at the shock spectral line corresponding to twice the classical bearing rolling element defect frequency. SHSPC is the magnitude at the shock spectral line corresponding to the classical bearing cage defect frequency. SHSPC2 is the magnitude at the shock spectral line corresponding to twice the classical bearing cage defect frequency. SHSPN is the magnitude at the shock spectral line corresponding to the classical bearing inner race defect frequency. SHSPO is the magnitude at the shock spectral line corresponding to the classical bearing outer race defect frequency. All of the sub-algorithms identified above use the rotating speed of the gearbox in order to define the frequency range in the shock spectrum to identify a condition indicator for a monitored component in the gearbox. Some of the sub-algorithms can be used to identify a location and type of anomaly (e.g., SHSPB, SHSPC, SHSPC2, SHSPN, and SHSPO). It should be appreciated that other sub-algorithms could be used to identify a frequency range for identifying a condition indicator.

In an illustrative example, FIGS. 6A-6C illustrate original data 307a-307c, sine spectrums 309a-309c, and shock spectrums 313a-c through a drive train component degrading. The sine spectrums 309a-309c include 1P and 2P indicating two points in frequency corresponding to the spectral lines for the SHSP1 and SHSP2. FIGS. 6A-6C demonstrate that conventional sine spectrums 309a-309c methods do not have energy at the 1P and 2P spectral lines to indicate an unhealthy condition at the stages of degradation of the component. Indeed, the 1P and 2P positions on the sine spectrums 309a-309c are flat and do not show any energy at a spectral line. In contrast, using the method 300, shock spectrums 309a-309c each includes a spectral line SHSP1 and spectral line SHSP2 at ranges determined by the sub-algorithms SHSP1 and SHSP2. The peak magnitude of the shock spectrum lines SHSP1 and SHSP2 increases from FIG. 6A to 6C, which indicates that a rotating component is in an unhealthy condition or otherwise degrading. Each of the peak magnitudes for SHSP1 and SHSP2 is a condition indicator.

Once a condition indicator has been determined, steps 305, 310, 320, 330, 340, and 350 can be repeated to determine a plurality of condition indicators in step 370. Method 300 can include step 380 that is based upon the plurality of condition indicators, determining an unhealthy condition of the plurality of condition indicators. Step 380 can include displaying the plurality of condition indicators in a graphical representation and/or other methods for arranging a plurality of condition indicators. Method 300 can include the step 385 of identifying an unhealthy component. In some embodiments, step 385 can also include identifying a particular type of defect. In some embodiments, the unhealthy component can include a plurality of unhealthy components. For example, the plurality of condition indicators can be used to identify a range of a healthy condition of the component being monitored. When the condition indicator increases above the range of the healthy condition, the condition indicator is in an unhealthy condition.

Figure 7:
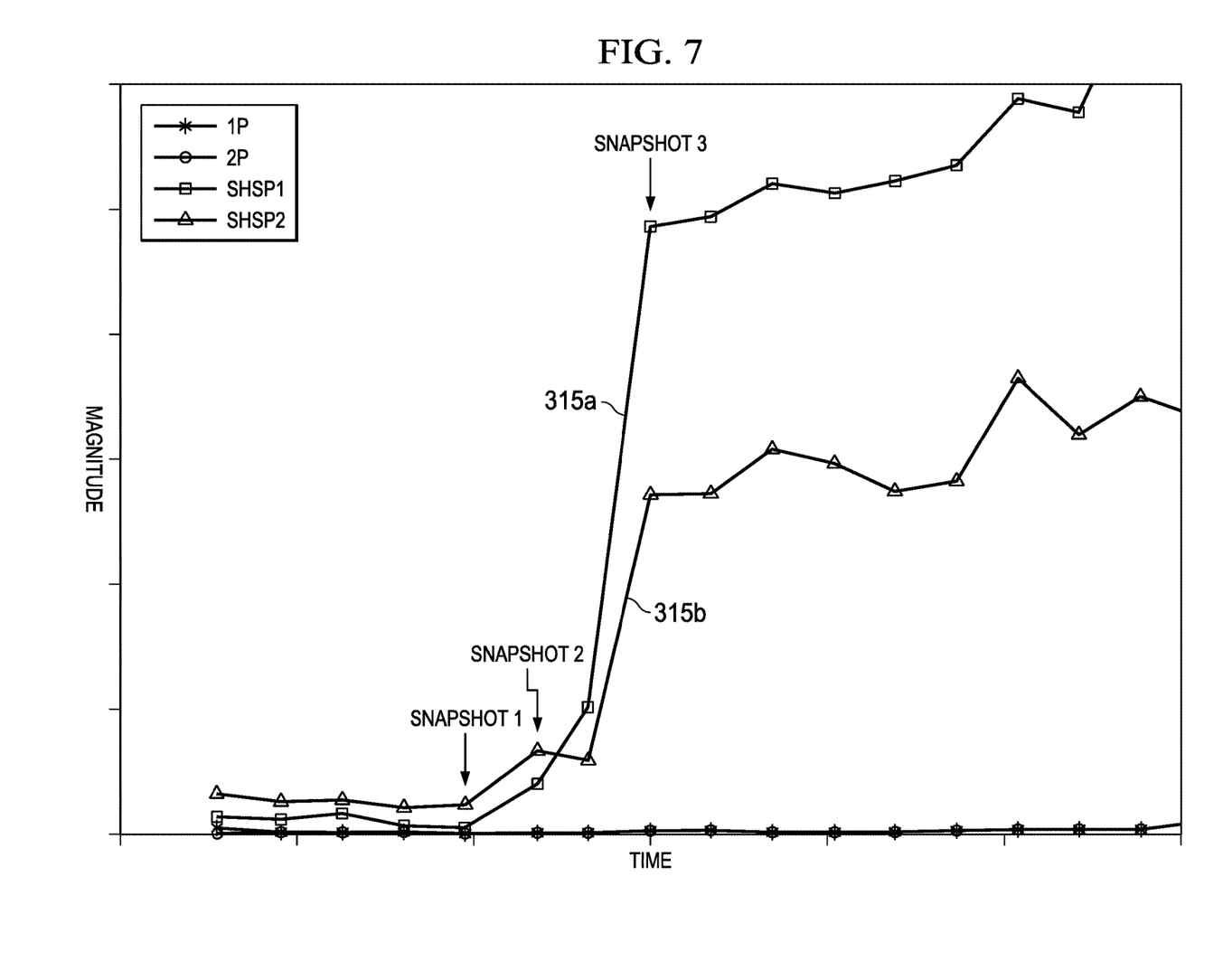
FIG. 7 is a graph illustrating a time history of the component degrading in FIGS. 6A-6C; according to an illustrative embodiment.

An illustrative example of step 370 includes condition indicators for SHSP1 and SHSP2 and sine spectrum 1P and 2P shown in FIGS. 6A-6C that are graphically plotted in FIG. 7. The X axis in FIG. 7 represents time. The Y axis represents magnitude. FIG. 7 shows that the sine wave spectrum failed to identify a component degrading. The condition indicators of SHSP1 and SHSP2 at the snapshot 1 point in time indicate a healthy condition since the condition indicators are within the range of the previous condition indicators. The SHSP1 condition indicators 315a and the SHSP2 condition indicators 315b at snapshots 2 and 3 increase above the snapshot 1 condition indicators and indicate unhealthy conditions of a component.

Method 300 can include the step 390 of adjusting at least one of the operation and maintenance of the unhealthy component. In an embodiment, the diagnostic device 230 analyzes the condition indicators, the identity of the unhealthy component, and/or the type of defect relating to the drive train 110 (health information) and identifies maintenance performed thereon. This analysis is done in order to assess the health of a particular monitored component and drive train 110. In an exemplary embodiment, the diagnostic device 230 may determine, based on the health information, that a monitored component is nearing failure, and generate an indication that the component requires maintenance. In an embodiment, the maintenance of an unhealthy component can be adjusted by determining when the unhealthy component should be repaired and/or replaced. An indication could be presented on a display, printed out on a hard copy, or may take the form of an automatically generated work order that identifies a necessary maintenance task for the drive train 110. In a particular embodiment, once the unhealthy component is identified, step 390 can include the pilot, crew, or other user remote from the aircraft adjusting the aircraft speed or other operational parameters to reduce, disengage or otherwise lessen the impact of the unhealthy component in the drive train 110 from damage and/or to reduce the likelihood of catastrophic failure during flight. In some embodiments, method 300 may predict upcoming replacement and/or repair times of an unhealthy component to ensure that the component is not replaced and/or repaired prematurely. Since the unhealthy component can be identified prior to failure using the systems, methods and devices descried herein, the unhealthy component can advantageously be repaired or replaced prior to damaging other components in the drive train 110.

Diagnostic system 200 may be installed on-board an aircraft 100 (as indicated in FIG. 2A), off-board (such as at a ground facility), or a combination of the two (as indicated in FIG. 2B). In an exemplary embodiment, when diagnostic system 200 is installed on-board aircraft 200, diagnostic system 200 can include a member 232 and a processor 234. In an embodiment, memory 232 is configured to store the output of original data indicative of the vibration, sounds, and/or acoustic signals over time. In an embodiment, the output of original data is stored in memory 232 at least before the diagnostic method 300 is initiated. Memory 232 represents any suitable storage mechanism and may store any data for use by a computer system. Memory 232 may comprise one or more tangible, computer-readable, and/or computer-executable storage medium. Examples of memory 232 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium. In an embodiment, processor 234 is configured to process original data from the vibration sensor system 212 and/or memory 232.

Diagnostic system 200 can include or otherwise be operably associated with a health and usage monitoring system (HUMS) 250 and a display 260. In an embodiment, HUMS 250 can receive outputs from the processor 234 regarding the health condition of the monitored component or system. In an embodiment, HUMS 250 can store original data in addition to memory 232. In some embodiments, HUMS 250 can store original data and the memory 232 is not included. In one embodiment, display 260 can receive outputs from the processor 234 that provide a visual indication of real-time health condition of the monitored component or system. Accordingly, a pilot of the rotorcraft 100 can be alerted to the real-time health condition of the monitored component in the drive train 110.

In another embodiment, as shown in FIG. 2B, diagnostic system 200 can be implemented by one or more computer systems 236 across one or more networks 238 and accessible by a user 240. Diagnostic system 200, as shown in FIG. 2B, can be configured to store original data related to the monitored component or system in memory 232. In an embodiment, the output of original data is stored in memory 232 at least before the original data is transmitted to one or more computers 236. The original data obtained by vibration sensor system 212 is transferred to one or more computer systems 236, typically after each flight. Computers systems 236 can be fixed or mobile on a ground station at various locations (e.g., an airport, military base, command center, manufacturer). The original data can be transferred over network 238 and/or using physical cabling or media; for example, but not limited to, hardwire cabling such as parallel cables, serial cables, USB cables, Firewire cables or the like or wireless protocols such as Bluetooth connectivity, infrared connectivity, radio transmission connectivity, Wi-Fi connectivity, other suitable communications protocol, removable memory cards, flash memory mass device, solid-state floppy disk card, non-volatile memory card, or other suitable memory storage entity.

Figure 8:
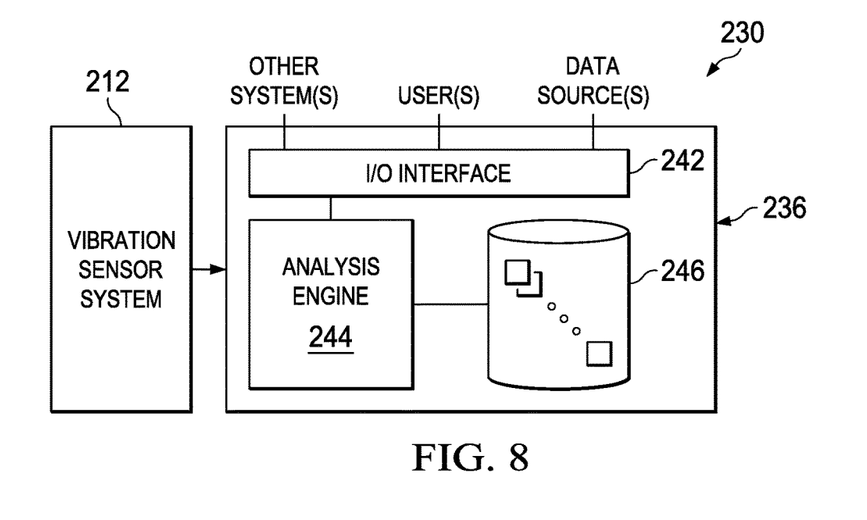
FIG. 8 is a schematic block diagram of a computer system, according to an illustrative embodiment.

Diagnostic system 230 can include computer system 236 as shown on FIG. 8. Computer system 236 can include an input/output (I/O) interface 242, an analysis engine 244, and a database 246. Alternative embodiments can combine or distribute the input/output (I/O) interface 242, analysis engine 244, and database 246, as desired.

Embodiments of system 236 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 242 can provide a communication link between external users, systems, and data sources and components of the system 236. The I/O interface 242 can be configured for allowing one or more users 240 to input information to the system 236 via any known input device. Examples can include vibration sensor system 212, memory 232, a keyboard, mouse, touch screen, and/or any other desired input device. The I/O interface 242 can be configured for allowing one or more users to receive information output from the system 236 via any known output device. Examples can include a display monitor, a printer, and/or any other desired output device. The I/O interface 242 can be configured for allowing other systems to communicate with the system 236. For example, the I/O interface 242 can allow one or more remote computer(s) to access information, input information, and/or remotely instruct the system 236 to perform one or more of the tasks described herein. The I/O interface 242 can be configured for allowing communication with one or more remote data sources.

For example, the I/O interface 242 can allow one or more remote data source(s) to access information, input information, and/or remotely instruct the system 236 to perform one or more of the tasks described herein.

The database 246 provides persistent data storage for system 236. While the term "database" is primarily used, a memory or other suitable data storage arrangement may provide the functionality of the database 246. In alternative embodiments, the database 246 can be integral to or separate from the system 236 and can operate on one or more computers. The database 246 preferably provides non-volatile data storage for any information suitable to support the operation of the system 236, including various types of data discussed further herein.

The analysis engine 244 can be configured for implementing at least one step in method 300. The analysis engine 244 can include various combinations of one or more processors, memories, and software components.

The device, system, and methods described herein can advantageously provide at least one of the following benefits: (1) the capability to collect and record vibrational information about aircraft components and systems during operation; (2) the capability to determine which component in the drive train is failing; (3) determine when a component in the drive train should be replaced or repaired prior to failure, which can prevent further damage to adjacent components; (4) only requires vibration sensors (and does not require synchronization); and (5) the ability to adjust the operation of the aircraft to lessen the impact of the unhealthy component in the drive train on the safety of the flight and damage to other components in the drive train.

The particular embodiments disclosed above are illustrative only, as the apparatus may be modified and practiced in different but equivalent manners apparent to those skilled in the art having the benefit of teachings herein. Modifications, additions, or omissions may be made to the apparatuses described herein without departing from the scope of the invention. The components of the apparatus may be integrated or separated. Moreover, the operations of the apparatus may be performed by more, fewer, or other components.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "a" and "an" are defined as one or more unless this disclosure explicitly requires otherwise.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

What is claimed is:

1. A method of diagnosing an anomaly of a monitored component in a drive train, the method comprising:
  generating a vibration signal from a vibration sensor system;
  obtaining, by a device configured to diagnose an anomaly, original data based only on samples of the vibration signal, the device configured to diagnose an anomaly includes a display;
  converting, by the device configured to diagnose an anomaly, the original data to an analytical signal having a real component and an imaginary component;
  determining, by the device configured to diagnose an anomaly, complex magnitudes of the analytical signal;
  processing, by the device configured to diagnose an anomaly, the complex magnitudes of the analytical signal to produce a frequency-domain signal; and
  determining, by the device configured to diagnose an anomaly, complex magnitudes of the frequency-domain signal to generate a shock spectrum;

wherein the device provides a real-time indication of the anomaly in the monitored component.

2. The method according to claim 1, wherein the step of processing comprises performing a discrete Fourier transform (DFT).

3. The method according to claim 1, further comprising:
obtaining rotational information associated with the component; and
identifying a condition indicator.

4. The method according to claim 3, further comprising: determining a plurality of condition indicators.

5. The method according to claim 4, further comprising:
based upon the plurality of condition indicators, determining an unhealthy condition of the plurality of condition indicators.

6. The method according to claim 5, further comprising: identifying an unhealthy component.

7. The method according to claim 6, further comprising: adjusting at least one of an operation and a maintenance of the unhealthy component.

8. The method according to claim 1, further comprising:
storing a history, by the device configured to diagnose the anomaly, of original data;
wherein the history being stored before a diagnostic operation for the component is performed.

9. A device configured to diagnose an anomaly of a monitored component in a drive train, the device comprising:
a vibration sensor system configured to generate a vibration signal;
a memory configured to store original data based on samples of a vibration signal;
a display; and
one or more processors in communication with the memory, the one or more processors being configured to:
obtain original data based only on samples of the vibration signal;
convert the original data to an analytical signal having a real component and an imaginary component;
determine complex magnitudes of the analytical signal;
process the complex magnitudes of the analytical signal to produce a frequency-domain signal; and
determine complex magnitudes of the frequency-domain signal to generate a shock spectrum;
wherein the device provides a real-time indication of the anomaly in the monitored component.

10. The device according to claim 9, wherein the processors are configured to:
obtain rotational information associated with the component; and
identify a condition indicator.

11. The device according to claim 10, wherein the processors are configured to:
determine a plurality of condition indicators.

12. The device according to claim 11, wherein the processors are configured to:
based upon the plurality of condition indicators, determine an unhealthy condition of the plurality of condition indicators; and
identify an unhealthy component.

13. The device according to claim 12, wherein the processors are configured to:
adjust at least one of an operation and a maintenance of the unhealthy component.

14. The device according to claim 9, wherein the original data is stored before a diagnostic operation for the component is performed.

15. A system for diagnosing an anomaly of a monitored component in a drive train, the system comprising:
a rotorcraft comprising a body, a power train coupled to the body and comprising a power source and a drive train coupled to the power source;
a vibration sensor system coupled to the drive train and configured to generate a vibration signal; and
a diagnostic device associated with the vibration sensor system, the diagnostic device operable to:
obtain original data based only on samples of the vibration signal;
convert the original data to an analytical signal having a real component and an imaginary component;
determine complex magnitudes of the analytical signal;
process the complex magnitudes of the analytical signal to produce a frequency-domain signal; and
determine complex magnitudes of the frequency-domain signal to generate a shock spectrum.

16. The system according to claim 15, wherein the vibration sensor system comprises at least one accelerometer.

* * * * *